2 Sheets—Sheet 1.
R. R. GWATHNEY.
Cotton Separator and Cleaner.
No. 198,105. Patented Dec. 11, 1877.
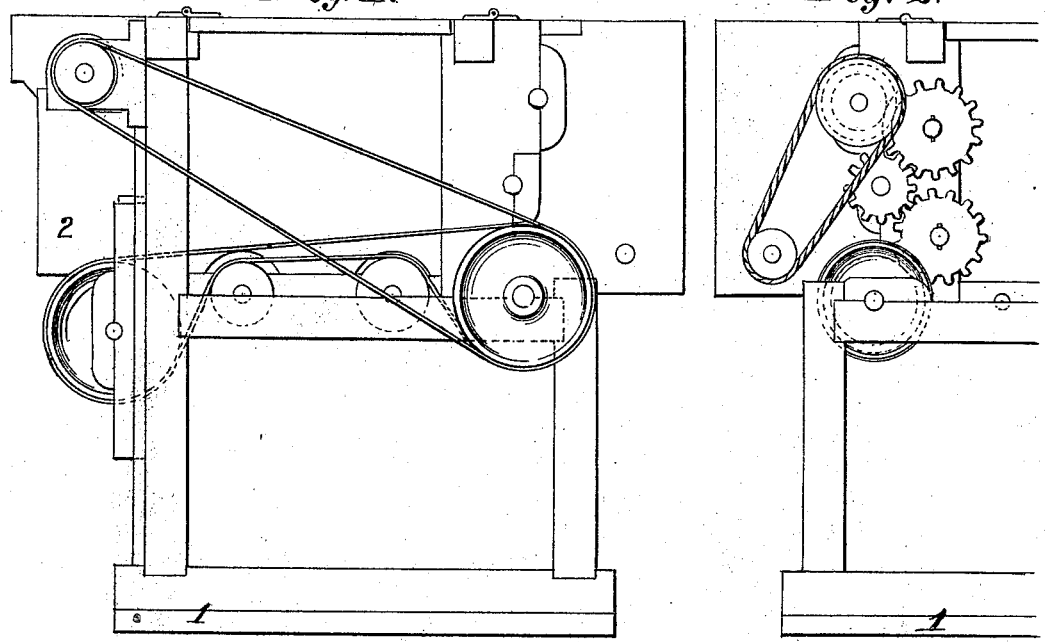
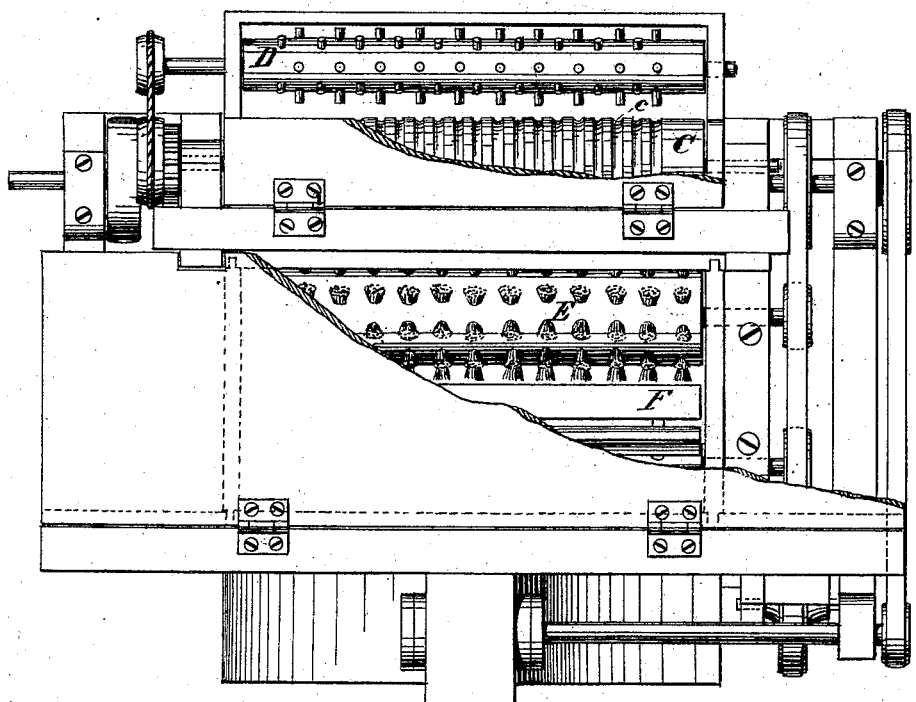
WITNESSES
Chas. J. Gooch
Le Flond Burdett
INVENTOR
Richard R. Gwathney
By Knight Bros. Attorneys.

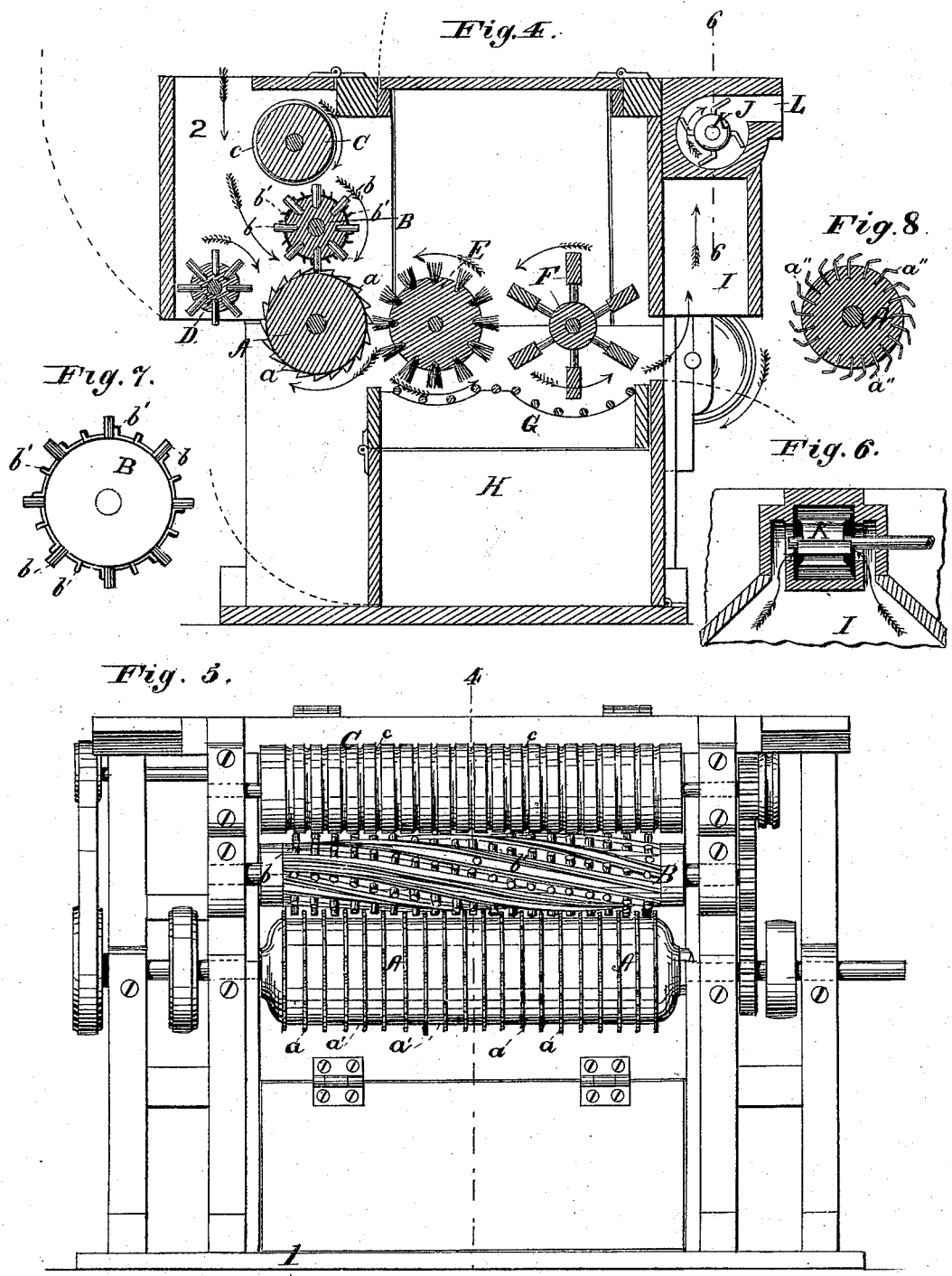

UNITED STATES PATENT OFFICE.

RICHARD R. GWATHNEY, OF LOUISVILLE, KENTUCKY.

IMPROVEMENT IN COTTON SEPARATOR AND CLEANER.

Specification forming part of Letters Patent No. 198,105, dated December 11, 1877; application filed June 9, 1877.

*To all whom it may concern:*

Be it known that I, RICHARD R. GWATHNEY, of Louisville, in the county of Jefferson and State of Kentucky, have invented certain new and useful Improvements in Cotton Separator and Cleaner, of which the following is a specification:

My invention relates to a machine for separating and cleaning cotton after the cotton has been gathered by a harvester which gathers everything it comes in contact with, namely, the bolls, leaves, and stems.

The object of this machine is to clear the cotton-fiber of the sticks and bolls, and, in a measure, the leaves, allowing only the seeds with the lint on them to pass through, bringing the cotton up to the same condition as hand-picked cotton from the field, thus preparing the cotton for the gin by removing the stalks and bolls from the seed-cotton.

My improvement consists, first, in providing such a machine with a stripper or retarding roller of peculiar construction. This roller is covered with a suitable number of rows of pins, arranged spirally. Between these rows of pins and in the spaces are floats, made of metal, and turned up on one edge. The object of these floats and pins is to keep back the bolls, sticks, &c.

My improvement consists, secondly, in combining with a cylinder having teeth a roller having rows of pins and floats, said cylinder and roller being so arranged as to permit the seed-cotton to pass between them.

My improvement consists, thirdly, in combining a grooved roller with the roller having pins, so as to prevent the sticks or bolls from passing with the seed-cotton.

My improvement consists, fourthly, in a series of rollers, consisting of a lower cylinder, an upper roller, and an intermediate roller, all constructed and arranged as hereinafter described.

My improvement consists, fifthly, in combining, with the series of rollers herein described, an agitator, a brush-cylinder, and a beater, all arranged as set forth.

In the accompanying drawings, Figure 1 is a side view of my boll and seed-cotton separator, showing the pulleys for operating the cylinder, brush-cylinder, beater, and fan. Fig. 2 is a view of a portion of the opposite side of the machine, showing the gearing and pulleys for revolving the stripper, roller, and agitator. Fig. 3 is a top view of the machine, portions of the covers being removed to show interior mechanism. Fig. 4 is a sectional elevation on the line 4 4, Fig. 5. Fig. 5 is a front view, the hopper being removed. Fig. 6 is a vertical section of the fan and the flue leading thereto, on the line 6 6, Fig. 4. Fig. 7 is a transverse section of a stripper or retarding roller on a larger scale. Fig. 8 is a transverse section of the main cylinder, showing a different form of tooth.

1 may represent a suitable base, upon which are secured a pair of frames, forming bearings for the operating mechanism. A is a cylinder, covered with sharp points $a$, let into the cylinder. The teeth are arranged in circumferential rows, and a filling, $a'$, is placed between the teeth up to their gums, so as not to leave any space for the bolls or sticks to pass. B is a stripper or retarding roller, for the purpose of keeping or holding back the sticks and bolls, and thus preventing them from passing over the cylinder with the seed-cotton. This cylinder or roller B is covered with rows of pins $b$, put on spirally, and spaced according to the spacing of the teeth on the cylinder A below it. Between these rows of pins $b$ and in the spaces are floats $b'$, made of metal, and turned up on one edge. The object of these floats is, in conjunction with the pins $b$, to keep back the bolls, sticks, and other foreign material. Above the roller B is another roller, C, also designed to keep back sticks and bolls. This roller is furnished with grooves $c$. D is an agitator or stirrer, for breaking up the bolls. This agitator is arranged at the bottom of the hopper 2, so as to throw the material upon the cylinder A. To the rear of the cylinder A is a brush-cylinder, E, and to the rear of the latter a beater, F. Beneath the brush and beater are a cradle, G, and a dust-chamber, H. I is a vertical flue, located in rear of the beater. This flue leads to a chamber, J, within which rotates a fan, K. L is the exit.

In Fig. 8 I show a main cylinder having bent teeth $a''$, formed of steel points.

Operation: The material as gathered by the harvester, or the bolls as collected by hand, are placed in the hopper 2, where the bolls are broken by the agitator D. The cotton is seized by the teeth on the cylinder, and drawn with the seeds between the cylinders A and B, the pins $b$ and floats $b'$ keeping back the sticks and bolls, which, being thus arrested, fall beneath the hopper. Should any sticks or bolls cling to the roller B, they will be kept back by the roller C. The seed-cotton seized by the cylinder is brought down by the brush E onto the cradle G, and beaten by a beater, F, the dust falling through into dust-chamber H. The seed-cotton is next drawn up the flue I by means of a strong blast created by a fan, K, and out through exit L. After passing through this separator the seed-cotton is ready for the gin.

Having thus described my invention, the following is what I claim as new, and desire to secure by Letters Patent:

1. In a boll and seed-cotton separator, the stripper or retarding roller B, having pins $b$ and floats $b'$, as and for the purpose set forth.

2. In a boll and seed-cotton separator, the combination of the cylinder A, having teeth $a$, and the roller B, having rows of pins $b$ and floats $b'$, said cylinder and roller being so arranged as to permit the seed-cotton to pass between them, as and for the purpose set forth.

3. The combination of the roller B, having pins $b$, and the roller C, having grooves $c$ for the passage of said pins, as and for the purpose set forth.

4. The combination of the cylinder A, having teeth $a$, roller B, having pins $b$, and roller C, having grooves $c$, as and for the purpose set forth.

5. In a boll and seed-cotton separator, the combination of the cylinder A, for removing seed with cotton, the roller B, for keeping back the bolls and sticks, the agitator D, for breaking the bolls, a brush, E, for transferring seed-cotton to beater, and a beater, F, for dusting, as and for the purpose set forth.

RICHARD R. GWATHNEY.

Witnesses:
JAMES B. COOK,
A. F. SCHÜLZE.